US00RE36598E

United States Patent [19]

George

[11] E Patent Number: Re. 36,598

[45] Reissued Date of Patent: Mar. 7, 2000

[54] APPARATUS AND PROCESS FOR THE PRODUCTION OF FIRE-REFINED BLISTER COPPER

[75] Inventor: David B. George, Salt Lake City, Utah

[73] Assignee: Kennecott Holdings Corporation, Salt Lake City, Utah

[21] Appl. No.: 08/926,846

[22] Filed: Sep. 11, 1997

Related U.S. Patent Documents

Reissue of:

[64] Patent No.: 5,449,395
Issued: Sep. 12, 1995
Appl. No.: 08/276,549
Filed: Jul. 18, 1994

[51] Int. Cl.[7] ..... C22B 15/06

[52] U.S. Cl. ..... 75/586; 75/639; 75/643; 75/644; 75/645; 266/144; 266/182; 266/217

[58] Field of Search ..... 75/586, 644, 645, 75/639, 643; 266/182, 144, 217

[56] References Cited

U.S. PATENT DOCUMENTS

| | | | |
|---|---|---|---|
| 3,612,720 | 10/1971 | Stark | 417/50 |
| 3,650,519 | 3/1972 | Vogt et al. | 266/36 H |
| 3,852,408 | 12/1974 | Ewan et al. | 423/243.1 |
| 3,883,045 | 5/1975 | Gerbig | 266/213 |
| 3,900,310 | 8/1975 | Kaasila et al. | 75/23 |
| 3,948,639 | 4/1976 | Nermes et al. | 75/9 |
| 4,005,856 | 2/1977 | Themelis et al. | 266/161 |
| 4,027,863 | 6/1977 | Aaltonen et al. | 266/162 |
| 4,030,915 | 6/1977 | Aaltonen et al. | 75/74 |
| 4,088,310 | 5/1978 | Noponen et al. | 266/162 |
| 4,113,470 | 9/1978 | Aaltonen et al. | 75/74 |
| 4,139,371 | 2/1979 | Makipirtti et al. | 75/73 |
| 4,169,725 | 10/1979 | Makipirtti | 75/74 |
| 4,236,700 | 12/1980 | Makipirtti et al. | 266/161 |
| 4,245,821 | 1/1981 | Kappell et al. | 266/163 |
| 4,308,058 | 12/1981 | Makipirtti et al. | 75/76 |

(List continued on next page.)

FOREIGN PATENT DOCUMENTS 16273 of 1892 United Kingdom ..... 75/645

OTHER PUBLICATIONS

Castle, et al., "Environmental Considerations in the Selection of Metallurgical Processes for the Extraction of Copper and Zinc", *XVth CMMI Congress*, SAIMM, 1994, vol. 2, pp. 315–324.

Rodloff, D., et al., "Review of Flash Smelting and Flash Converting Technology", presented at the 1986 Annual Meeting of AIME, New Orleans, Louisiana, Mar., 1986, pp. 1–32.

Smith, TJA et al, "Oxygen Smelting and the Olympic Dam Project" *Proceedings of the Intenational Symposium on the Impact of Oxygen on the Productivity of Non–Ferrous Metallurgical Processes* Winnipeg Canada pp. 49–50, Aug. 23–24, 1987.

C R Haywood An Outline of Metallurgical Practice p. 24 (D. Van Nostrand Co), 1964.

*Primary Examiner*—Melvyn Andrews
*Attorney, Agent, or Firm*—Whyte Hirschboeck Dudek

[57] ABSTRACT

Fire-refined blister copper is produced from copper concentrate by a process comprising:

A. melting and oxidizing the copper concentrate in a smelting furnace to produce molten matte and slag, and to separate one from the other;

B. removing the molten matte from the smelting furnace;

C. solidifying the molten matte;

D. injecting the solidified matte into a converting furnace in which the matte is converted to blister copper and slag; and E. transfering the blister copper from the converting furnace to an anode furnace to produce fire-refined blister copper.

After the fire-refined blister copper is produced in the anode furnace, it is typically transferred to an anode casting wheel on which it is converted to copper anodes suitable for subsequent electrolytic refining to cathode copper.

20 Claims, 2 Drawing Sheets

U.S. PATENT DOCUMENTS

| | | | |
|---|---|---|---|
| 4,415,356 | 11/1983 | Victorovich et al. | 75/21 |
| 4,416,690 | 11/1983 | Richards et al. | 75/26 |
| 4,421,552 | 12/1983 | Hoffmann et al. | 75/639 |
| 4,470,845 | 9/1984 | Yannopoulos | 266/144 |
| 4,544,141 | 10/1985 | Mackey et al. | 266/215 |
| 4,599,108 | 7/1986 | Hanniala | 75/73 |
| 4,615,729 | 10/1986 | Victorovich et al. | 75/21 |
| 4,645,186 | 2/1987 | Hanniala | 266/212 |
| 4,740,240 | 4/1988 | Sulzbacher et al. | 75/625 |
| 4,802,917 | 2/1989 | Victorovich et al. | 75/26 |
| 4,830,667 | 5/1989 | Marcuson et al. | 75/76 |
| 4,895,595 | 1/1990 | Fischer | 75/62 |
| 4,915,730 | 4/1990 | Elias et al. | 75/7 |
| 4,927,460 | 5/1990 | Simcock | 75/10.14 |
| 5,007,959 | 4/1991 | Reist et al. | 75/645 |
| 5,013,355 | 5/1991 | Elvander et al. | 75/23 |
| 5,078,785 | 1/1992 | Ibaracki et al. | 75/386 |
| 5,176,875 | 1/1993 | Kanazumi et al. | 266/241 |
| 5,178,818 | 1/1993 | Ikoma et al. | 266/196 |
| 5,180,422 | 1/1993 | Kikumoto et al. | 75/644 |
| 5,180,423 | 1/1993 | Marcuson et al. | 75/649 |
| 5,181,955 | 1/1993 | Asteljoki et al. | 75/443 |
| 5,194,213 | 3/1993 | Diaz et al. | 266/142 |
| 5,205,859 | 4/1993 | Goto et al. | 75/640 |
| 5,215,571 | 6/1993 | Marcuson et al. | 75/626 |
| 5,217,527 | 6/1993 | Goto et al. | 75/645 |
| 5,281,252 | 1/1994 | Landolt et al. | 75/585 |
| 5,320,662 | 6/1994 | Goto et al. | 75/645 |
| 5,320,799 | 6/1994 | Goto et al. | 266/213 |

APPARATUS AND PROCESS FOR THE PRODUCTION OF FIRE-REFINED BLISTER COPPER

Matter enclosed in heavy brackets [ ] appears in the original patent but forms no part of this reissue specification; matter printed in italics indicates the additions made by reissue.

FIELD OF THE INVENTION

This invention relates to the pyrometallurgy of copper. In one aspect, this invention relates to the smelting of copper concentrates to produce fire-refined blister copper while in another aspect, this invention relates to a copper smelting apparatus and process that allows the uncoupling, in both space and time, of the smelting and converting furnaces and their respective operations. In another aspect, this invention relates to a process for the smelting of copper that is both energy efficient and that has a very low impact on the environment.

BACKGROUND

Copper smelting involves two primary process steps: (1) smelting to produce copper matte, and (2) converting to produce copper metal. While smelting technology has changed dramatically in the last thirty years, converting has changed little since Messrs. Peirce and Smith developed the side blown converter in the early 1900's. Although the Peirce-Smith converter has proven its worth over time, its design does not lend itself well to compliance with the ever increasingly stringent environmental requirements that copper producers must meet. This is due primarily to processing liquid matte, slag and metal in multiple vessels, and transferring each from one vessel to another by use of ladles and overhead bridge cranes.

In the late 1970's, Kennecott Corporation began an investigation of alternatives to Peirce-Smith with copper converting, and one result of its efforts was U.S. Pat. No. 4,416,690. According to the process of this patent, solid matte particles are fed to a converting vessel with oxygen and flux in such a manner that the converting reaction is conducted autogenously and with the evolution of substantially undiluted sulfur dioxide gas (which can be captured and used in the production of elemental sulfur or sulfuric acid). This converting process eliminates the need for the transferring of liquid matte from the smelting furnace to the converting furnace, and the concomitant fugitive gas emissions. The process is known as solid matte oxygen converting.

Mitsubishi Materials Corporation teaches in U.S. Pat. No. 5,205,859 an apparatus and process for the continuous smelting of copper. In this process, copper concentrate is melted and oxidized in a smelting furnace to produce liquid matte and slag, and then both are transferred to a separating furnace in which one is separated from the other. The liquid matte is transferred to a converting furnace in which it is converted to blister copper, and the blister copper is then transferred to a plurality of anode furnaces for further fire refining. The transfer of product from one furnace to another is accomplished by a series of launders and since the entire process is continuous, balanced production and transfer must be maintained to keep the process operational.

While the Mitsubishi and various other processes known and in use today all produce copper, to one degree of efficiency or another, all are subject to improvement, particularly with respect to environmental efficiency. The reality of today is that not only must the copper producer be cost efficient, but it must also be environmentally efficient. Not surprisingly, a continued interest exists in the development of copper producing technology that accomplishes both these ends.

SUMMARY OF THE INVENTION

According to this invention, fire-refined blister copper is produced from copper concentrate by a process comprising:

A. melting and oxidizing the copper concentrate in a smelting furnace to produce molten matte and slag;

B. removing the molten matte and slag from the smelting furnace in separate streams;

C. solidifying the molten matte;

D. feeding the solidified matte into a converting furnace in which the matte is converted to blister copper and slag; and E. transferring the blister copper from the converting furnace to an anode furnace to produce fire-refined blister copper.

After the fire-refined blister copper is produced in the anode furnace, it is typically transferred to an anode casting device, typically a horizontal casting wheel, on which it is converted to copper anodes suitable for subsequent electrolytic refining to cathode copper.

In a preferred embodiment of this invention, the smelting and converting furnaces are flash furnaces, and the converting step is solid matte oxygen converting as described in U.S. Pat. No. 4,416,690. In this and other embodiments, the molten matte is transferred from the smelting furnace to a solidification apparatus, e.g. granulating or casting equipment, and the solidified product is either transferred to the converting furnace, with or without prior size reduction, or is stored. This uncoupling of the smelting and converting furnaces allows virtually complete flexibility in scheduling their respective uses, and allows one to be physically remote (e.g. off-site) from the other.

In other preferred embodiments of this invention, the blister copper is transferred from the converting furnace to a series of anode furnaces that are operated such that the converting furnace can maintain continual operation. The blister copper is typically transferred from the converting furnace to the anode furnaces by an arrangement of launders in combination with a molten metal divertor. In certain embodiments, a holding furnace is positioned between the converting furnace and the anode furnaces to receive, hold and in some circumstances, process, the blister copper prior to its transfer to the anode furnaces.

In another embodiment of this invention, the twin rotating anode furnaces are replaced with a single, non-rotating furnace. In this embodiment, the furnace is sized to process in a like amount of time the equivalent of the twin rotating furnaces operated in tandem, and the furnace is designed with separate oxidizing and reduction zones in fluid communication with one another that are operated continuously and simultaneously.

The process of this invention is environmentally efficient. In certain embodiments, copper concentrate can be converted to fire-refined blister copper with capture of at least about 98 percent, preferably at least about 99 percent, of the input sulfur, and sulfur dioxide emissions can be reduced to less than about 5, preferably less than about 3, kilograms per metric ton of copper produced. By "capture" is meant that the input sulfur, i.e. the sulfur value of the copper concentrate, is retained in the process or leaves the process as a product or by-product, e.g. a metal sulfide, sulfuric acid, etc. In addition, particulate and acid mist emissions are significantly reduced.

BRIEF DESCRIPTION OF THE DRAWINGS

FIG. 4a is a side view of a launder arrangement in combination with a divertor.

FIG. 4b is a top view of the launder arrangement and divertor of FIG. 4a.

DETAILED DESCRIPTION OF THE INVENTION

Figure 1:
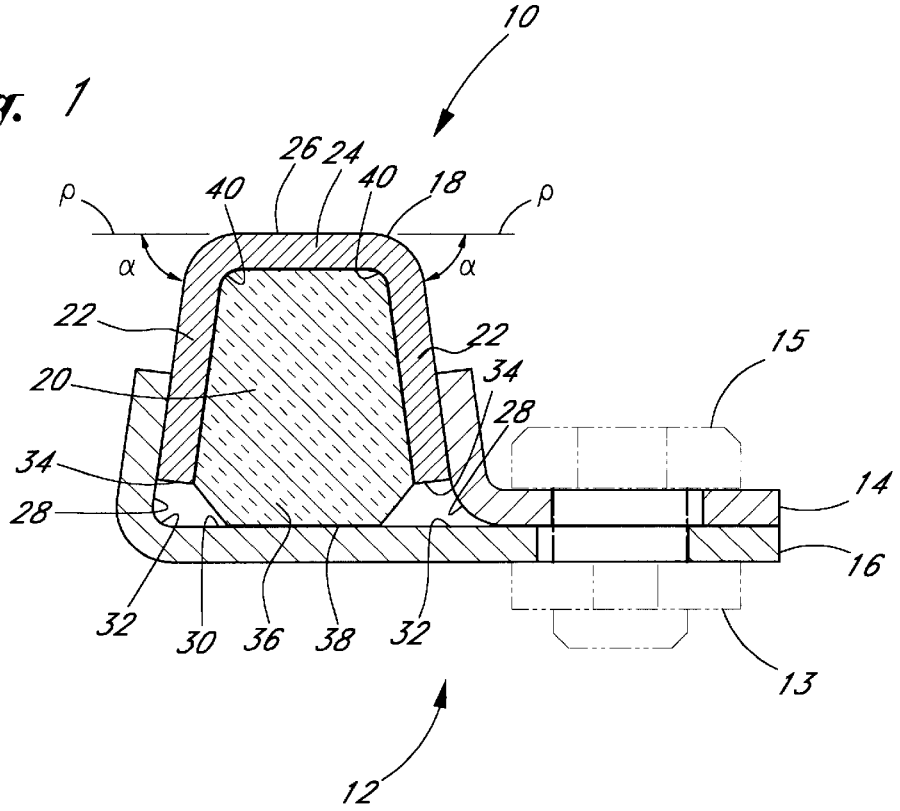
FIG. 1 is a schematic flow diagram of one embodiment of this invention.

The copper concentrates used in the practice of this invention can be prepared by any conventional process, and typically contain between about 10 and 50, preferably between about 20 and 40, percent by weight copper. The concentrates contain other metals, e.g. iron, lead, bismuth, arsenic, molybdenum, one or more precious metals. etc., that are associated with the copper in the ore deposit, and these metals, as well as the copper, are present in the concentrate principally as sulfides. The concentrate is preferably in particulate form, typically with an average particle size less than about 65 U.S. mesh.

Smelting furnaces are available in a number of different designs, but are basically of two kinds: melt and oxidative. The former are designed more to melt than oxidize the concentrate, and thus they produce a low-grade matte, e.g. a matte with a copper concentration between about 30 and 50 percent by weight. Since the use of a high-grade matte, e.g. a matte with a copper concentration above 50, preferably between 60 and 80, percent by weight, is preferred in the converting step of this invention, melt-type smelting furnaces are not favored for use in the practice of this invention.

Oxidative-type smelting furnaces are also of two basic designs, bath and flash, and either design can be used in the practice of this invention. Both designs are well known in the copper smelting industry. Representative bath smelters include those operated by Noranda Inc. at its Horne, Canada facility; Mitsubishi Materials Corporation at its Naoshima, Japan facility; and Isamelt at its Mt. Isa, Australia facility. Representative flash smelters include those operated by Outokumpu Oy at its Harjavalta, Finland facility, and Inco Limited at its Sudbury, Canada facility. Because flash smelting furnaces can be operated in a manner more consistent with existing and foreseeable environmental regulations than bath smelting furnaces (they are more readily sealed against fugitive gas and particulate emissions than bath furnaces), flash smelting furnaces are the preferred smelting furnaces for use in this invention. Outokumpu flash smelting furnaces are particularly preferred.

The copper concentrate is fed to the smelting furnace in conventional fashion. If the furnace is a flash smelting furnace, then the concentrate is mixed with flux and optionally recycled converter slag and/or slag concentrate (all of appropriate size), and the mix is then dried and fed (e.g. blown) into the furnace with oxygen or oxygen-enriched air. In certain embodiments of this invention, the concentrate and other feed components to the flash furnace are reduced to fine particle size by any conventional technique, e.g. ballmill or vertical roller grinding. The furnace is operated in conventional fashion, and the concentrate is transformed into an essentially quiescent pool of molten matte and slag within the confines of the furnace. The matte and slag are allowed to separate within the furnace (slag floats to the top of the matte because it is less dense than the matte), and the molten matte and slag are removed separately. The slag is removed from the furnace by skimming it from the surface of the matte through one or more appropriately located tap holes or skimbay openings in one or more walls of the furnace. It is collected in a conventional transport vessel, and then it is removed from the furnace site for further processing or disposal. The molten matte is drained from the furnace through one or more appropriately located tap holes (usually different from those used to remove the slag), in one or more walls of the furnace, and then solidified.

Any process and apparatus that will solidify molten matte can be used in the practice of this invention. These processes include water and air granulation, casting, and a cooled vibrating plate. Casting is not favored because it produces large masses or chunks (e.g. an average size measured in inches or feet) of matte which in turn usually require more processing, e.g. grinding, before use as a feed to the converting furnace, and it is slow (cooling can take minutes to hours, depending upon the size of the casting). Moreover, this solidification process is difficult to control environmentally (it produces considerable fugitive gases, particularly if artificial means of cooling are employed, such as forced air or water spray).

The cooled, vibrating plate process, i.e. the process in which molten matte is fed or dropped onto a cooled and vibrating plate on which it quickly solidifies and eventually falls into a storage area or onto a transfer vessel, is also not favored because it too produces relatively large chunks, e.g. disk-shaped chunks in excess of 6 inches in diameter, and these too are relatively slow (e.g. tens of seconds) to cool to an ambient temperature.

While air granulation is quick and produces small particles relative to casting and the vibrating plate, this too is a less preferred process of solidifying the molten matte because the sulfur and iron values in the matte readily react with the oxygen in the air, and this can cause pollution problems. Volitile heavy metals such as lead, arsenic and cadmium can also be liberated and once liberated, these become a difficult enviromental control problem. As such, air granulation usually requires pollution control equipment not otherwise needed in other forms of molten matte solidification.

One variation on air granulation is the use of an inert gas, e.g. nitrogen, to avoid the oxidation of the sulfur values in the matte. However, this process is cumbersome and expensive in terms of a large-scale commercial smelting operation.

The preferred process of molten matte solidification is water granulation. Two preferred water granulation techniques are water spray and mechanical dispersion. In the water spray technique, molten matte is simply poured through a spray or curtain of water (typically under high, e.g. about 20 to about 150 psi, pressure) which results in a rapid quench of the matte and the formation of small, sand-like granules. The granules or particles are cool to the touch within a few tenths of a second of formation, and little, if any, fugitive gases, volitile heavy metals, or particulate matter is created.

Mechanical dispersion also produces small, sand-like granules that are cool to the touch within a few tenths of a second of formation and with little, if any, formation of fugitive gases, heavy metals or particles, but this technique requires more in terms of apparatus. However, the granules produced by this process tend to be coarser than those produced by the water spray technique, and thus tend to contain less moisture (which means that particles made by this technique require less drying before undergoing downstream processing).

Regardless of the process used to solidify the molten matte, preferably the solidified matte is subjected to a size reduction step before it is fed to the converting furnace. The solidified matte can be reduced in size by any conventional technique, e.g. verticle roller mills or air-swept ball mills. With respect for use as a feedstock to a flash converting furnace, preferably the matte is reduced to an average particle size of less than about 65 mesh (U.S. Standard), but larger particle sizes can be used, e.g. about 0.2–2.0 mm.

Copper matte, flux, and optionally, dust from any of the various matte processing steps, are fed to a converting furnace in any conventional manner. Converting furnaces are basically of two types, flash (also known as suspension) and bath, and the purpose of both furnaces is to oxidize, i.e. convert, the metal sulfides to metal oxides. Representative bath furnaces include those used by Noranda Inc. at its Horne, Canada facility, and Inco Limited at its Sudbury, Canada facility. Representative flash converting furnaces include those used by Outokumpu Oy at its Harjavalta, Finland facility, and the KHD Contop Cyclone furnace used by Asarco at its El Paso, Tex. facility. The Outokumpu flash converting furnace is a preferred converting furnace for use in the process of this invention. The converting step raises the copper concentration in the matte from 50–80 percent by weight to about 98 plus percent by weight.

While the copper matte can be fed to the converting furnace in any suitable manner, in the preferred embodiment (in which the furnace is a flash converting furnace) the matte is fed as a dry, finely divided particulate (150 U.S. mesh/$P_{80}$ or in other words, eighty percent of the particles will pass through a 150 U.S. mesh sieve). Preferably, the furnace is operated such that the matte is converted to blister copper using the solid matte oxygen conversion process taught in U.S. Pat. No. 4,416,690 (which is incorporated herein by reference). According to this process matte, oxygen and flux are fed into the furnace such that the converting reaction is conducted autogenously (although small amounts of various fuels can be burned to provide auxiliary heat to the reaction for purposes of exercising tight furnace control). Molten blister copper accumulates within the furnace, and the slag accumulates on the top of the molten copper. Preferably, the flash converting furnace is operated on a continuous basis.

While the slag is separated from the blister copper in a manner similar to that in which it is separated from the matte in the smelting flash furnace, the removal of the blister copper from the flash furnace is preferably accomplished through the use of a continuous blister tapper (CBT) as opposed to one or more tap holes (although these can be used if desired). The design and operation of the CBT can vary to convenience, but preferably it is attached to the furnace in such a manner that the blister is continuously transferred from the furnace to the CBT while the slag is retained in the furnace.

In one embodiment of this invention, the blister copper is transferred from the converting furnace, preferably through a CBT, to a holding furnace. The primary purpose of this furnace is to provide scheduling flexibility to the overall smelting process, i.e. to provide a location for the accumulation of molten blister if the anode furnaces cannot accept it for any reason directly from the converter. However in certain embodiments of this invention, the holding furnace can be adapted to not only hold the molten blister, but also to further process it prior to its introduction into an anode furnace.

In a typical and preferred embodiment of this invention, two rotating anode furnaces are located proximate to the converting or holding furnace, as the case may be, and are sized to accommodate the output from the converting and/or holding furnace. These furnaces are typically of conventional design and operation, and are used in tandem with one another such that while one is fire-refining the blister to anode copper, the other is filling. The output from the anode furnaces is transferred to an anode casting device (of any conventional design) on which the anodes are formed and subsequently removed to electrolytic refining. The copper concentration in the anode copper is 98 plus percent.

In another embodiment of this invention, a single anode furnace, either rotating or nonrotating, is located proximate to the converting or holding furnace, as the case may be, and is sized to accommodate the output from the converting and/or holding furnace. This nonrotating furnace can be of any suitable configuration, and consists of an oxidation zone and a reduction zone. These zones are separated by any conventional means, e.g. a dam or baffle, but are otherwise in fluid communication with one another such that the oxidized blister can move freely and continually from the oxidation zone to the reduction zone.

*In a preferred embodiment of this invention,* [B]*b*lister copper is transferred from the converting furnace to the anode furnace by a series of refractory-lined, hooded launders that converge at a molten metal divertor which, in turn, directs or diverts the blister to one of the anode furnaces. If the smelting and converting process train includes only one anode furnace, then a divertor is not needed and the blister can be laundered directly from the converting furnace to the anode furnace. The divertor can be of any suitable shape and design although a shallow dish shape with a pouring lip is a preferred design. The divertor is sized to accommodate continuous transfer of blister from the converting furnace to the anode furnaces; it is refractory-lined and hooded (like the launders); it is equipped with a burner to keep the blister molten; and it is rotably mounted such that it can direct the output from the converter to the open anode furnace. If a holding furnace is positioned between the converter and the anode furnaces, then it is positioned between the converting furnace and the divertor. Preferably, the launders and divertor are arranged such that the blister moves through the system under the force of gravity.

Various embodiments of the invention are further described in the drawings in which like numerals are employed to designate like parts. Although items of equipment, such as valves, fittings, pumps, condensers, holding tanks, pipes, and the like, have been omitted so as to simply the description, those skilled in the art will recognize that such conventional equipment can be employed as desired.

FIG. 1 is a schematic flow diagram of one preferred embodiment of this invention. Copper concentrate is transferred by any conventional means (not shown) from storage area 10 to concentrate hoppers 11a and 11b for blending with slag or slag concentrate and flux which are held in slag hopper 12a and flux hopper 12b. The flux (typically metallurgical grade silica, i.e. silicon dioxide) is acquired from any convenient source, and the slag is typically a blend of converting furnace slag and smelting furnace slag concentrate (the latter a product of flotation to increase its copper content). All are sized and blended for optimum operation of the smelting furnace. These feeds can be sized either before or after blending with one another, although typically the sizing, if required at all, is performed prior to blending (the flux and slag components of the blend are usually considerably more coarse than the copper concentrate component). The respective amounts of concentrate, flux and slag/slag concentrate in the smelting furnace feed will vary with, among other things, the nature of the concentrate and in certain embodiments and for various reasons, neither slag nor slag concentrate is a component of the feed.

After the concentrate, flux and if present, converter slag are blended with one another (by means not shown), the blend is transferred by conveyor 13 to dryer 14 in which the moisture content of the blend is reduced from typically about 8–10 percent, based on the weight of the blend, to typically less than about 0.5 percent. Dryer 14 is a rotating drier drum, typically gas-fired, positioned such that it is at a slight angle with the ground. The blend enters dryer 14 at its elevated end, travels the length of the dryer under the force of gravity and under a blanket of nitrogen (to minimize oxidation), and exits the dryer at its lower end into dryer bin 15. The operating conditions of dryer 14 will vary with a host of variables, but typically the blend will be exposed to temperatures in excess of 100° C. for ten or more than minutes. The dried blend is then pneumatically transferred from dryer bin 15 to single, dual-hopper feed bin 16 using high density pneumatic conveying equipment, such as that available from Paul Wurth S. A. of Belgium. From bin 16, the blend is then fed into flash smelting furnace 17. Dust and gases from dryer 14 and bin 15 are gathered and transferred by means not shown to electrostatic precipitator 18 and other cleaning equipment not shown for collection and ultimate return to the smelting process.

Figure 2:
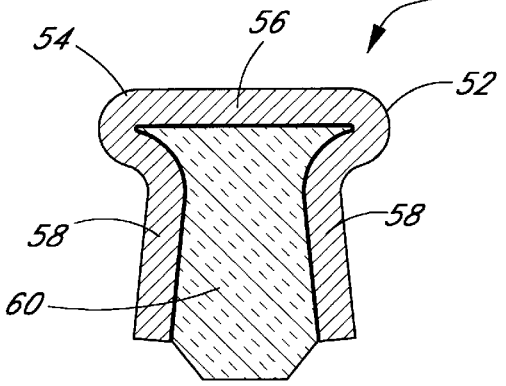
FIG. 2 is a side, cut-away view of a flash smelting furnace.

The design of the flash smelting furnace can vary, and those described in U.S. Pat. Nos. 3,900,310, 4,169,725, 4,599,108 and 5,181,955 (all of which are incorporated herein by reference) are illustrative. Typically and as shown in FIG. 2, the furnace comprises reaction shaft 19, lower furnace 20, and uptake shaft 21. The furnace is equipped with concentrate burner 22 and extensive water cooling (not shown) to prolong the useful life of the furnace. The dried blend and oxygen (or oxygen-enriched air) are fed to the burner in such a manner that the concentrate is smelted to matte and slag both of which accumulate into an essentially quiescent pool in lower furnace 20. Since the slag is less dense than the matte, it rises to the surface of the pool and is periodically removed from the furnace by any conventional technique (e.g. skimming through one or more slag tap holes not shown). The collected slag is then cooled, crushed, and then typically ground and floated to produce a copper concentrate suitable for recycling to smelter furnace 17. If the slag is not to be recycled for any reason, e.g. an undesirable metal composition, insufficient furnace capacity, etc., then other disposal options are available, e.g. sale to slag processors for extraction of residual metal values, land fill, and the like.

Furnace 17 is sealed in a gas-tight manner such that the hot fugitive gases, e.g. sulfur, carbon and nitrogen oxides, water vapor, etc., produced by the smelting process are retained in and channeled through the furnace to uptake shaft 21 in which the gases are collected and from which the gases are discharged to waste heat boiler 23a (FIG. 1) through means not shown. In waste heat boiler 23a (examples of which are those built and marketed by Ahlstrom of Finland), the majority of the latent heat value of the gases is captured and return to various points within the process. The heat-extracted gas is then transferred by means not shown to hot electrostatic precipitator 24a (examples of which are those built and marketed by ABB Flakt of Sweden).

The smelting of copper concentrates creates considerable amounts of dust (which comprises a wide range of materials including unsmelted or partially reacted concentrate and flux, matte, various metal values including copper and precious metals, and the like) and for environmentally sound operation, this dust must be captured and either returned to the process or otherwise appropriately disposed. Since the dust contains considerable metal value, especially copper and precious metals, preferably it is collected and returned to smelting furnace 17. Much (e.g. 60–70 percent) of the dust that is emitted from smelting furnace 17 is captured in waste heat boiler 23a, and the vast majority (e.g. 99 plus percent) of the dust not captured in the waste heat boiler is captured in hot electrostatic precipitator 24a. The gases leaving precipitator 24a and those leaving precipitator 24b are cleaned separately (by means not shown, e.g. a wet scrubber), and then these cleaned gases are combined (by means not shown) for further cleaning in, for example, another wet scrubber and/or a wet electrostatic mist precipitator (also not shown) to remove quantitatively any residual dust prior to the gases entering acid plant 25.

The dust collected from waste heat boiler 23a and hot electrostatic precipitator 24a is transferred to collection hopper 26, and from here to smelter dust bin 27 for subsequent charging to furnace 17. In certain embodiments of this invention, some of the dust collected in hopper 26 can be transferred to hydrometallurgical facility 28 for further processing, i.e. for recovery of various metal values such as bismuth, copper, lead, arsenic, antimony, and the like. The timing of the transfer and the amount of dust actually transferred, if any, to hydrometallurgical facility 28 is dependent upon a number of different factors not the least of which is the metal composition of the dust, the metal composition of the concentrate feed to smelting furnace 17, and the operating parameters of the smelting furnace. Dust is conveyed throughout the overall process by pneumatic means (not shown).

The scrubbed gases are transferred to acid plant 25 for recovery of marketable sulfuric acid. Flash smelting furnace 17 is operated at conditions which generate concentrated sulfur oxide gas (relative to bath smelters and typically of 30–40 percent strength), and in turn these gases lend themselves well to the efficient and quantitative recovery of commercial sulfuric acid from their sulfur content. In a preferred embodiment of this invention, the acid plant is designed not only to emit very low levels of sulfur dioxide (e.g. less than 100 ppmv $SO_2$), but also to produce steam as a by-product. In this preferred embodiment, the clean gas is diluted with air to 14% $SO_2$, and then converted to sulfuric acid. As such, these gases leave the overall smelting process as a marketable product as opposed to undesired stack emissions.

The latent heat value of the fugitive gases from smelting furnace 17 that is recovered in waste heat boiler 23a is transferred to power plant 29 which generates power for use in the overall smelting process. In a preferred operation of this invention, the overall process including capture of heat values from the acid plant) will generate in excess of eighty percent of its own energy requirements. This results in a major reduction in the energy required from conventional fossil fuels (as compared to most conventional copper smelting processes in operation today), and thus a major reduction in the environmental impact that necessarily flows from the consumption of fossil fuels.

Matte is withdrawn from furnace 17 through one or more matte tap holes (not shown), and transferred by enclosed launder (not shown) to high-pressure water matte granulator 30. Granulator 30 is preferably of the design as that used in the pyrometallurgy of nickel at the Outokumpu Metals OY smelter at Harjavalta, Finland, and is sized consistent with the output of the smelting furnace. This apparatus is also designed for an essentially quantitative capture of any fugitive dust and gases that may be emitted from the granulation process. The granulated matte produced by the process is sand-like in appearance (e.g. between about 0.2 mm and 2 mm in size), and contains about 4 to 8 percent moisture.

One of the hallmarks of the pyrometallurgy of this process is the separation of the smelting and converting steps in both space and time. The matte, once granulated and cooled, can be converted immediately or stored or shipped for future consumption. If the downstream operations of the process are out of service for any reason, e.g. maintenance, upset, inadequate capacity, etc., the matte can simply be stored in any conventional manner in matte storage facility 31 until needed. In the alternative, the matte can be shipped to another site for conversion to blister copper. In any event, this separation of smelting and converting steps eliminates the need to transfer liquid matte from the smelting furnace to the converting furnace, which in turn eliminates a major source of potential gas emissions and the ripple effect inherent with any continuous process (i.e. a problem in one part of the process affecting all parts of the process).

In the preferred operation of the process of this invention, sufficient matte is stored to provide the smelter with at least several days of feed. Matte is transferred from storage facility 31 by any suitable means (not shown), e.g. conveyor, land vehicles, etc., to matte grinding station 32 at which it is reduced to an optimum size (e.g. to an average article size of less than about 65 U.S. Standard mesh) for conversion in flash converter furnace 33. As noted above, the size reduction can be accomplished by any conventional technology, but vertical roller mills, such as those available from Loesche, are preferred.

After suitable size reduction, preferably to a dust-like appearance, the matte is pneumatically conveyed by high density technology to flash converter furnace 33 by way of baghouse 34 in which fugitive dust (i.e. matte) is captured and transferred by means not shown to dust hopper 35. The matte is collected from baghouse 34 into transfer hopper 36, pneumatically transferred to matte feed hopper 37, passed through weigh cell 38, blended with dust and flux from hoppers 35 and 39, respectively, and then fed to flash converter furnace 33. The matte has an average particle size of less than about 65 U.S. Standard mesh, the dust has an average particle size less than about 100 U.S. Standard mesh, and the lime-based flux has an average particle size of less than about 6 U.S. Standard mesh.

Flash converting furnace 33 is a smaller version of flash smelting furnace 17 except that the former has more extensive water and air cooling (not shown) than the latter. It operates in much the same manner as the flash smelting furnace. Matte, flux, dust and $O_2$-enriched air are fed to the single matte burner in such a manner that upon ignition, the matte is converted autogenously (as taught in U.S. Pat. No. 4,416,690). Supplemental heat can be employed for furnace control purposes as desired. As in the flash smelting furnace, the resulting blister copper and slag are collected in the lower furnace in an essentially quiescent pool, and dust-laddened gases are channeled to the uptake shaft for transfer to waste heat boiler 23b. These transferred gases are processed in the same manner as the gases transferred from flash smelting furnace 17 to waste heat boiler 23a, and ultimately these two gas streams are combined for cleaning in the wet scrubbers and/or electrostatic mist precipitators prior to processing in acid plant 25. However, the dust captured from the gas stream discharged from flash converter furnace 33 may be recycled back to furnace 33 by means not shown.

Converter slag is removed from furnace 33 in a manner similar to the removal of smelter slag from furnace 17, i.e. the slag is skimmed from the surface of the blister copper and is discharged from the furnace through one or more slag tap holes. However, unlike the smelter slag processing procedure of collection in pots, cooling, and flotation, the converter slag is transferred by way of heated, covered launders (not shown) to high pressure water slag granulator 40 (similar in most respects to matte granulator 30). The slag is reduced to a sand-like consistency, and recycled to the flash smelting furnace by means not shown.

Blister copper can be removed from flash converting furnace 33 by any suitable means, but preferably the furnace is equipped with a heated forehearth or CBT (FIG. 3) from which blister copper can be continuously withdrawn. In this embodiment, the CBT and lower furnace are in fluid communication with one another by means of a passage through which blister copper can continuously pass from the lower furnace to the CBT. The passage is designed such that slag will not enter the CBT, and the furnace and CBT are operated in such a manner that the blister copper is not allowed to solidify within the passage or CBT. Typically the blister copper is kept in a molten state while in the CBT by means of one or more burners located above the CBT.

Figure 3:
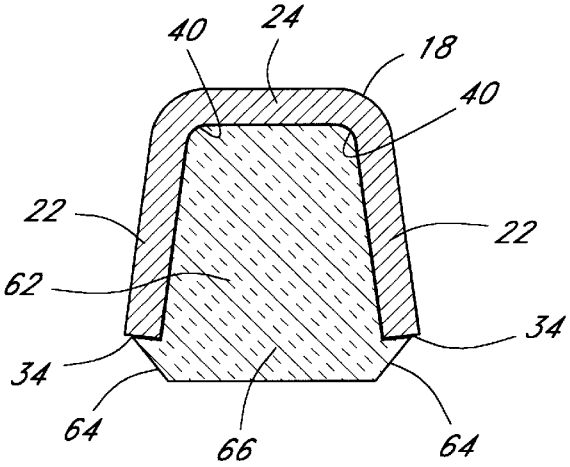
FIG. 3 is a side view of a continuous blister tapper.

In a one embodiment of this invention, the blister copper is kept in a molten state through the use of an induction furnace as described in FIG. 3. In this embodiment, lower furnace 41 of a flash converter furnace is in open fluid communication with CBT 42 by means of furnace taphole 43 which is preferably located at or near the lowest part of the lower furnace end wall. Taphole 43 is designed and located in the furnace end wall and the flash converter furnace is operated in such a manner that slag does not enter taphole 43. In the usual converting operation, the flow of blister copper from lower furnace 41 through taphole 43 into CBT 42, and eventually through CBT overflow 44 into launder 45, is continuous and as such, the continuous motion of the blister copper, in combination with heat imparted from burners (not shown) located above the CBT, retards any tendency for it to solidify.

In those circumstances, however, in which the continuous flow of blister copper is stopped, then the copper has a tendency to solidify (which is generally undesirable because before continuous operation can be resumed, the solidified blister must either be physically removed or remelted, neither of which is an easy task). In a preferred embodiment of this invention, the blister copper is maintained in a molten state through the use of transformer 46 which is preferably a simple static step-down transformer, the secondary single-turn winding (not shown) of which consists of a loop of the blister copper.

In operation, blister copper is heated through the action of transformer 46 as it flows through taphole 44 into CBT 42. As a result, the blister copper at the bottom of the CBT is hotter that the blister copper at the top of the CBT, and this in turn imparts hydrostatic pressure, electrodynamic power and convection to the blister copper or in other words, this temperature difference imparts movement to the blister copper within the CBT and taphole 43. This in turn, retards any tendency for the blister copper to solidify (both in the CBT and taphole 43), either when it is in continuous motion from lower furnace 41 to launder 45, or when it is simply being held in the CBT. In addition, this induction heating minimizes or eliminates the need for the fuel-fired heating from burners located above the CBT, and this in turn minimizes fugitive gases and ventilation requirements for the CBT.

Blister copper can be removed from the CBT by any one of a number of different means, such as simple gravitational draining or natural or induced overflow draining through one or more tapholes or overflow spouts. The former is simply the result of filling the CBT from the power furnace until the blister reaches and moves through the taphole(s) or overflow spout(s). The latter requires pumping or elevating the blister to the taphole(s) or overflow spout(s) which are located above the top surface of the blister within the CBT in the absence of the induced elevation. This pumping or elevating can be accomplished by any one of several techniques.

In one technique, the bottom of the CBT is fitted with one or more porous plugs through which an inert gas, e.g. nitrogen, is pumped. This gas swells the volume of blister copper within the CBT such that the top surface of the blister is raised to or above a taphole or overflow spout through which the blister can drain into a launder. In another technique, the CBT is fitted with an induction pump which imparts convection to the blister such that it is induced to "climb" an induction conveyor or ladder to a taphole or overflow spout located above the top surface of the blister. In both techniques, the need for external burners above the CBT is reduced or eliminated which in turn reduces or eliminates the fugitive gases generated through the action of such a burner. These techniques also assist in managing the flow of the blister while it travels through the CBT.

In one embodiment of the first technique, the blister can be removed from the CBT through intermittent tapping. Under continuous operation, the level of the pool of blister and slag in the lower furnace is maintained such that the flow of blister into the CBT is at the same rate as the flow of blister out of the CBT. One factor in maintaining this balance is the removal of slag from the lower furnace. In those circumstances in which the production of blister is reduced due to a reduction in feed to the furnace, or in those circumstances in which downstream processing makes a demand for more blister, or both, blister can continue to flow temporarily from the CBT at or near the baseline rate (i.e. the rate prior to the change in circumstances) by allowing slag to accumulate in the lower furnace. This adds overburden to the blister in the lower furnace and in turn, this forces the blister level in the CBT to rise.

In those circumstances in which the production of blister is increased beyond the capacity of downstream processing, or in those circumstances in which the capacity of downstream processing is reduced, the blister level in the CBT can be lowered by removing additional slag from the lower furnace. This reduces the overburden on the blister within the lower furnace, and this in turn allows for the accumulation of blister within the lower furnace without causing a concommitent rise in the blister level in the CBT.

In effect, the process of this invention allows for intermittent tapping by allowing for the use of slag as a piston for raising and lowering the level of blister in the lower furnace which in turn influences directly the level of blister in the CBT. The lower furnace and CBT form a U-tube, albeit with arms of different size, and an action on the level of a fluid in one arm has a proportionate influence on the level of fluid in the other arm. Continuous smelting and converting processes that do not employ a furnace and/or CBT do not afford this level of flexibility in production scheduling.

Regardless the method of removing the blister copper, once removed it is channeled by way of heated, covered launders either directly to anode furnaces 47a and 47b, or to a holding furnace (not shown). Preferably the anode refining furnaces are operated in such a manner that while one is filling, the other is processing the blister copper to anode copper. The design and size of the anode furnaces can vary to conform to the overall design of the smelting operation, but typically these are rotary furnaces sized such that when operated in tandem (i.e. in sequence), they can process the entire output of flash converting furnace 33 without interruption. The rotary anode refining furnaces manufactured by Kumera of Finland are exemplary.

In one embodiment of this invention, the blister copper is first routed to a holding furnace (not shown) in which it can simply be held in a molten state, or in which it can be further oxidized. Positioning, in sequence if not in space, a holding furnace between the converting furnace and the anode furnaces imparts flexibility to the overall smelting process by providing a location in which to store molten blister copper in those circumstances in which the anode furnaces cannot accept the blister for any reason, e.g. maintenance, upset, etc. In addition, the blister can be further processed in the holding furnace, to remove sulfur for example, which in turns either reduces the duration of or eliminates altogether the air blowing (oxidation) stage in the anode furnaces. Here too, the holding furnace is sized consistent with the other equipment in the smelting operation, and it is of any conventional design. In this embodiment, the holding furnace can be equipped with porous plugs to permit gas stirring while the blister is simply in a holding stage.

Figure 4:
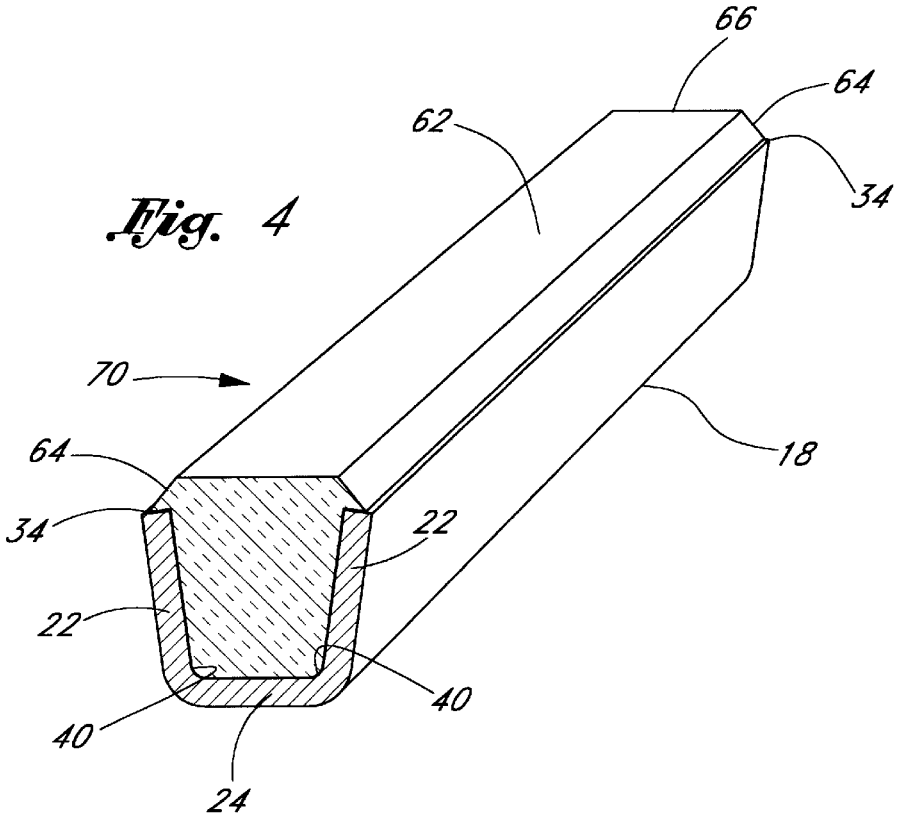
Figure 4B:
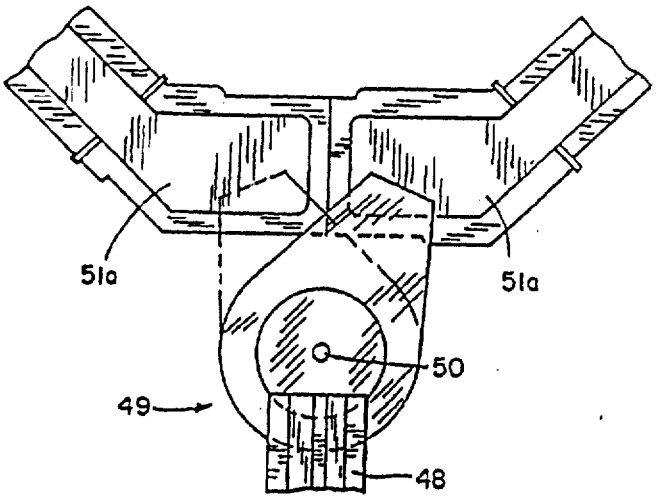
Figure 5:
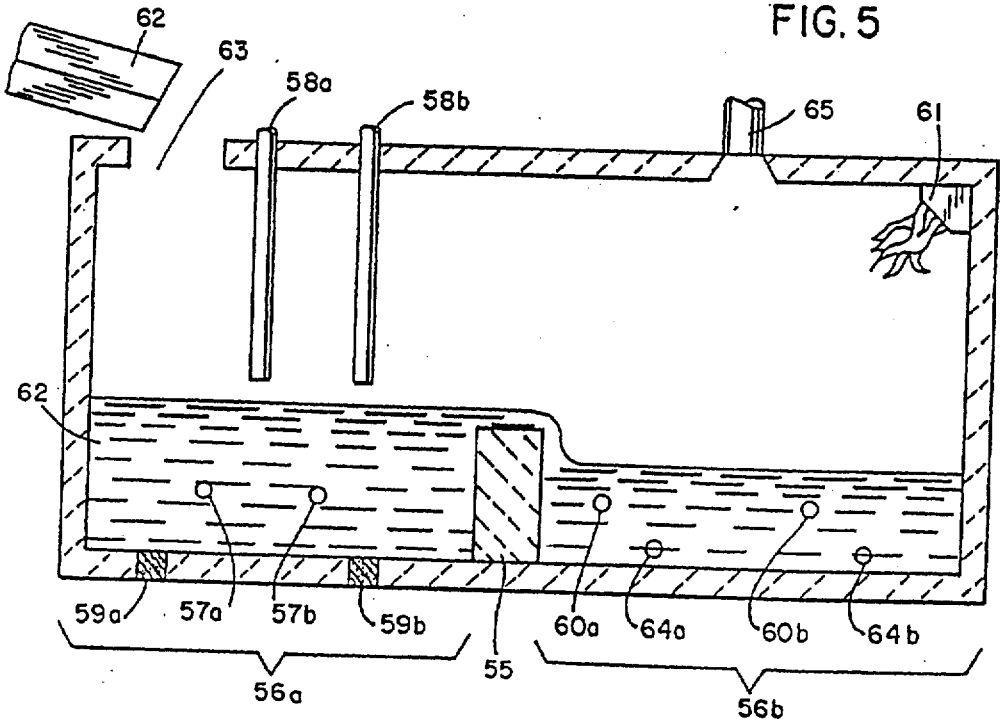

The blister is channeled to the anode furnaces by means of heated, covered launders in combination with a heated, covered divertor (FIGS. 4a and 4b). Regardless of the source of the blister, i.e. the flash converter or a holding furnace, the blister travels from the source through launder 48 to divertor 49 which is design to rotate about central axis 50 between launders 51a and 51b which in turn deliver the blister to furnaces 47a and 47b, respectively. Divertor 49 is equipped with cover 52, and is lined with refractory 53. Divertor 49 is also equipped with a burner (not shown) for maintaining the blister in a molten state, and divertor 49 is mounted on turret 54 which allows divertor 49 to pivot between launders 51a and 51b. All the launders used throughout the smelting process, like the divertor, are lined appropriately with refractory, and covered or sealed against escape of fugitive gases.

The anode furnaces are operated in conventional fashion. Upon filling, the blister is blown with oxygen or $O_2$-enriched air, preferably through multiple tuyeres, such that the remaining sulfur values are quantitatively oxidized, and then the oxidized blister is reduced with conventional reagents such as one or more hydrocarbons in combination with air, ammonia alone or in combination with an inert gas such as nitrogen, and the like. During oxidation and reductin, the furnace is rotated such that the tuyeres (not shown) are positioned beneath the surface of the blister. During reduction, the furnace may be rotated back to its filling position, and the reducing agents sparged through one or more porous plugs located in the lower surface of the furnace. Each furnace is equipped with at least one burner (not shown) typically located at or near one end of the furnace and at or near its top wall.

Figure 5:
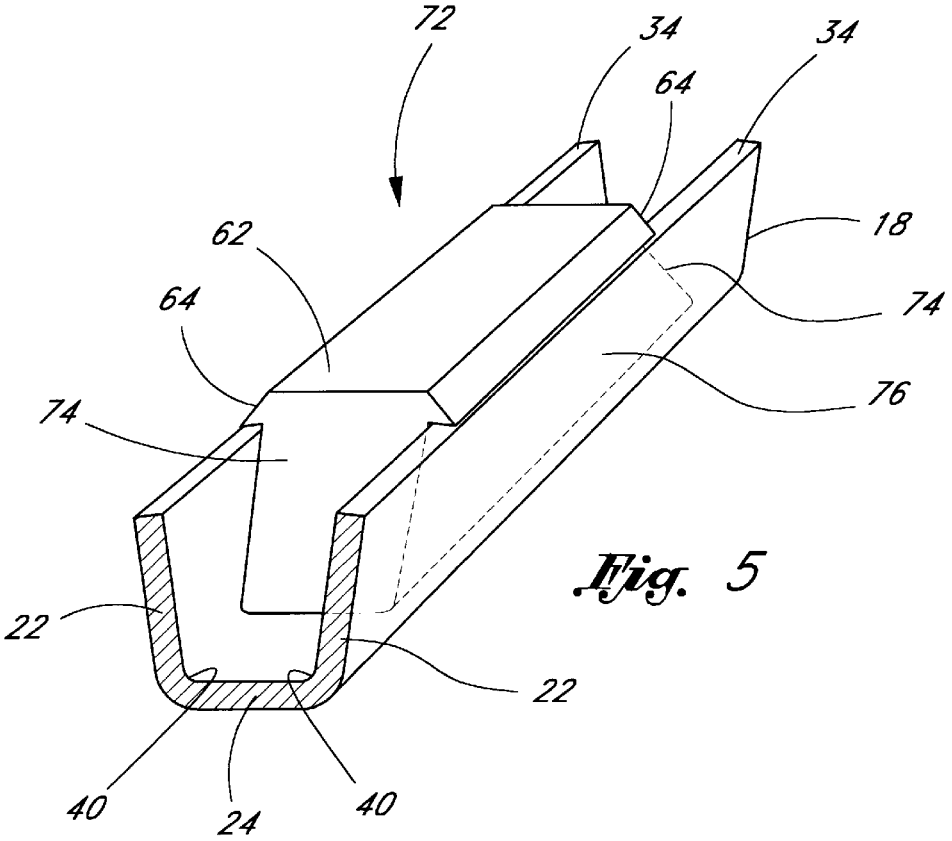
FIG. 5 is a side view of a nonrotary anode furnace.
Figure 1:
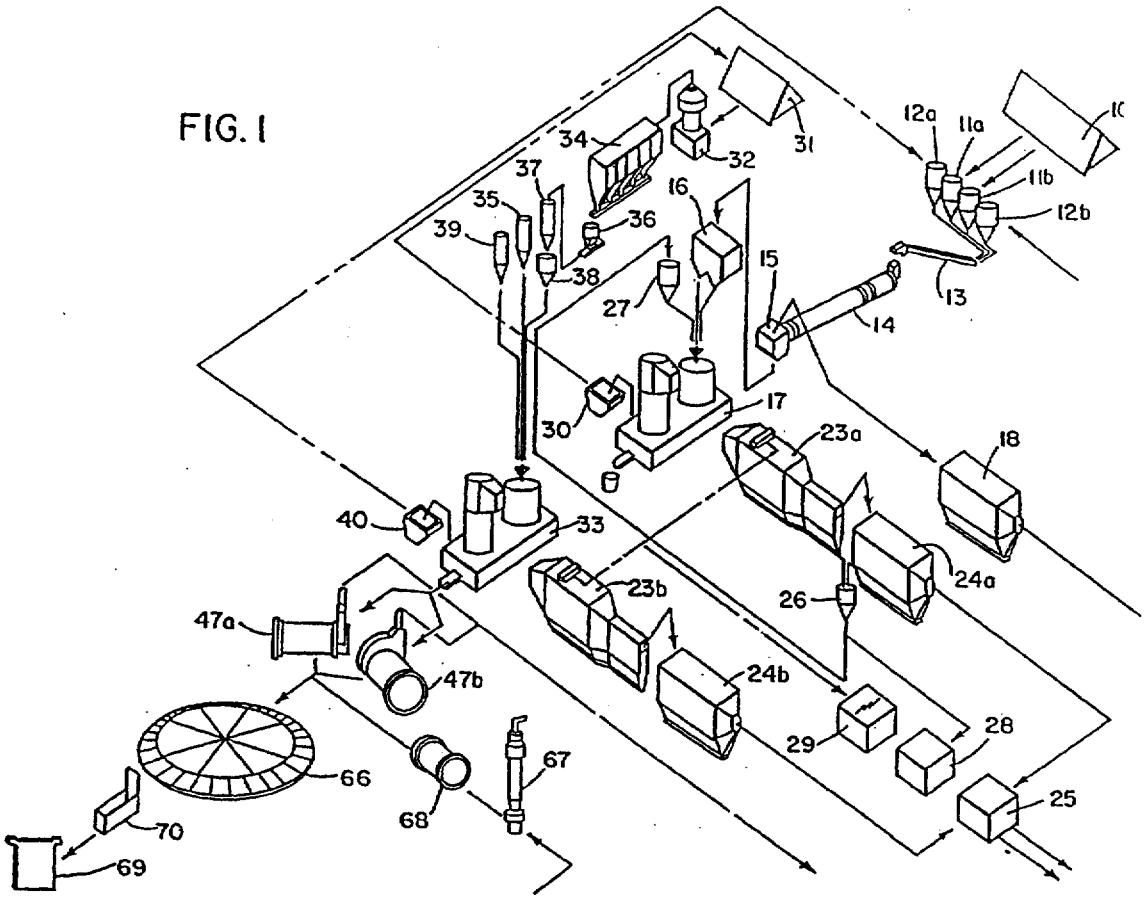

In another embodiment of this invention, the anode furnace is designed for continuous operation. The nonrotary furnace of this design (FIG. 5) is equipped with a dam 55 which divides the furnace basin into oxidation zone 56a and reduction zone 56b. Oxidation zone 56a is equipped with tuyeres 57a and 57b and overhead lances 58a and 58b for oxygen blowing, and porous plugs 59a and 59b for gas stirring. Reduction zone 56b is equipped with tuyeres 60a and 60b for introduction of reducing gases and overhead burner 61 to maintain the blister at the desired temperature. Blister copper 62 moves from oxidation zone 56a to reduction zone 56b by the continuous overflowing of dam 55 at a rate that is determined in large part by and is in registration with the rate at which blister copper is introduced into oxidation zone 56a from launder 62 through feed port 63. Anode-grade copper is removed from reduction zone 56b through tapholes 64a and 64b at a similar rate. Gases and dusts exit the furnace through port 65 for subsequent cleaning and processing. The design of this furnace allows for continuous operation which eliminates the need for a second furnace.

After the blister is refined to anode copper (98% or greater copper), it is discharged from the anode furnace by conventional means, e.g. pouring, to anode casting wheel 66. This wheel, the Sumitomo rotary casting wheel is exemplary, is designed to accommodate the sequential output of both furnaces 47a and 47b, or the output of a single nonrotary furnace, without interruption of the anode furnace(s). In addition, wheel 66 is designed to accept anode copper from shaft furnace 67 through holding furnace 68. The output from shaft furnace 67 is small as compared to either of the anode refining furnaces and as such, the output is collected in holding furnace 68 until a sufficient amount has been accumulated to justify transfer to the casting wheel. The source of copper for shaft furnace 67 is primarily recycled refinery scrap anodes, i.e. copper with a purity typically in excess of 98%). Anode copper 69 is removed from wheel 66 at station 70 by conventional techniques.

Off-gases from both anode furnaces, the shaft furnace and all holding furnaces, as well as from the rotary dryer, launders, distribution dish and casting wheel, are collected by means not shown, and cleaned of particulate matter in high efficiency baghouses and/or scrubbers followed by desulferization in scrubbers. This combination of gas collection in combination with the flash smelting and converting processes results in an extremely efficient control of emissions, in some embodiments with a capture rate in excess of 99% of fugitive emissions, both particulate and gaseous.

In addition, the preferred embodiments of this invention, i.e. those in which high capacity flash furnaces are employed, produce very small volumes of process gas in the first instance. Preferably the flash furnaces used in these embodiments operate with 70% oxygen enrichment which in turn produces unusually high strength $SO_2$ gas. By way of example, a smelting furnace designed to process an average of 3,000 tones per day of 28% copper concentrate will produce about 1,360 tons per day of 70 percent copper matte. The gas volume from the smelting furnace is about 25,000 SCFM and from the converting furnace about 11,000 SCFM, both containing 38% $SO_2$. The combined gas volume from the two furnaces is 36,000 SCFM which is lower than that produced from a single Peirce Smith converter.

Although this invention has been described in considerable detail by reference to the drawings and assorted examples, this detail is for illustration only, and it is not to be construed as a limitation upon the invention as described in the appended claims.

What is claimed is:

1. A process for smelting copper concentrates containing sulfur values to produce fire-refined blister copper as a principal product and slag and sulfur dioxide as by-products, the process comprising:

A. melting and oxidizing the copper concentrate in a smelting furnace to produce molten matte, molten slag, and gaseous sulfur dioxide;

B. removing the molten matte, molten slag and gaseous sulfur dioxide from the smelting furnace in separate streams;

C. solidifying the molten matte;

D. feeding the solidified matte into a converting furnace in which the matte is converted to molten blister copper, molten slag and gaseous sulfur dioxide;

E. removing the molten blister copper, molten slag and gaseous sulfur dioxide from the converting furnace in separate streams;

F. transferring the blister copper from the converting furnace to an anode furnace through an arrangement of covered launders [and a covered divertor]; and G. fire-refining the blister copper in the anode furnace to produce anode copper and sulfur dioxide; the process conducted in a manner such that less than about 2 percent of the sulfur values in the copper concentrate and less than about 5 kilograms per metric ton of copper of sulfur dioxide are released to the enviroment.

2. The process of claim 1 in which the copper concentrate is melted and oxidized through the action of a flash smelting furnace.

3. The process of claim 2 in which the molten matte is removed from the smelting furnace through a taphole in a sidewall of the furnace, and then transferred through a covered launder to solidification means.

4. The process of claim 3 in which the molten matte is poured from the covered launder through a curtain of water to form granular, sand-like particles of matte.

5. The process of claim 4 in which the solid matte is transferred to and held in a storage area before used as a feed to the converting furnace.

6. The process of claim 5 in which the solid matte is dried and reduced in size to dust-like particles before fed to the converting furnace.

7. The process of claim 6 in which the solid matte is converted to blister copper through the action of a flash converting furnace.

8. The process of claim 7 in which the blister copper is removed from the converting furnace through a continuous blister tapper which is in fluid communication with the furnace.

9. The process of claim 8 in which the blister copper is routed from the continuous blister tapper through the launder [and divertor] arrangement, *into and through a divertor,* to one of two rotary anode furnaces operated in tandem.

10. The process of claim 8 in which the blister copper is routed from the continuous blister tapper through a covered launder to a holding furnace in which it is further oxidized before transfer through a launder and divertor arrangement to one of two rotary anode furnaces operated in tandem.

11. An apparatus for producing fire-refined blister copper as a principal product and slag and sulfur dioxide as by-products from copper concentrates containing sulfur values, the apparatus comprising:

A. a flash smelting furnace for melting and oxidizing copper concentrate to produce molten matte, molten slag, and gaseous sulfur dioxide;

B. solidification means for converting the molten matter into solid matte;

C. covered launders for transferring the molten matte from the flash smelting furnace to the solidification means;

D. means for capturing the gaseous sulfur dioxide and processing it for use as a feed to an acid plant for the production of sulfuric acid;

E. a flash converting furnace for melting and oxidizing solidified matte to blister copper, molten slag, and gaseous sulfur dioxide;

F. means for transferring the solidified matte to the flash converting furnace;

G. an anode furnace for fire-refining the blister copper to a quality suitable for casing copper anodes;

H. a covered launder [and divertor] arrangement for transferring the blister copper from the flash converting furnace to the anode furnace; and I. means for capturing the gaseous sulfur dioxide and processing it for use as a feed to an acid plant for the production of sulfuric acid.

12. The apparatus of claim 11 further comprising means for drying and sizing the copper concentrate prior to its introduction into the flash smelting furnace.

13. The apparatus of claim 12 in which the drying means is a rotary kiln.

14. The apparatus of claim 13 in which the solidification means is a water granulation apparatus.

15. The apparatus of claim 14 in which the means for capturing the gaseous sulfur dioxide includes a waste heat boiler, electrostatic precipitator and a wet scrubber train.

16. The apparatus of claim 15 further comprising pneumatic transfer means for transporting the solidified matte from the water granulator to the storage area, and from the storage area to the converting furnace.

17. The apparatus of claim 16 further comprising apparatus for drying and size reducing the solidified matte before its use as a feed to the converting furnace.

18. The apparatus of claim 17 *in which the covered launder arrangement includes a diverter, and* in which the anode furnace comprises two rotary furnaces operated in tandem.

19. The apparatus of claim 18 further comprising a holding furnace positioned between the converting furnace and the anode furnace.

20. The apparatus of claim 17 in which the anode furnace is a nonrotary furnace comprising an oxidation zone and reduction zone, the zones divided by a dam.

* * * * *

UNITED STATES PATENT AND TRADEMARK OFFICE

CERTIFICATE OF CORRECTION

PATENT NO. : Re.36,598
DATED : March 7, 2000
INVENTOR(S) : David B. George

It is certified that error appears in the above-indentified patent and that said Letters Patent is hereby corrected as shown below:

On the title page, the sheets of drawings consisting of figures 1-5, should be deleted to appear as per attached figures 1-5.

The title page, should be deleted as per attached title page.

Column 9, line 35, "article" should read—particle--.

Signed and Sealed this

Sixth Day of March, 2001

*Attest:*

Nicholas P. Godici

NICHOLAS P. GODICI

*Attesting Officer*

*Acting Director of the United States Patent and Trademark Office*

United States Patent [19]

George

[11] E Patent Number: Re. 36,598

[45] Reissued Date of Patent: Mar. 7, 2000

[54] APPARATUS AND PROCESS FOR THE PRODUCTION OF FIRE-REFINED BLISTER COPPER

[75] Inventor: David B. George, Salt Lake City, Utah

[73] Assignee: Kennecott Holdings Corporation, Salt Lake City, Utah

[21] Appl. No.: 08/926,846

[22] Filed: Sep. 11, 1997

Related U.S. Patent Documents

Reissue of:

[64] Patent No.: 5,449,395
Issued: Sep. 12, 1995
Appl. No.: 08/276,549
Filed: Jul. 18, 1994

[51] Int. Cl.[7] ..... C22B 15/06

[52] U.S. Cl. ..... 75/586; 75/639; 75/643; 75/644; 75/645; 266/144; 266/182; 266/217

[58] Field of Search ..... 75/586, 644, 645, 75/639, 643; 266/182, 144, 217

[56] References Cited

U.S. PATENT DOCUMENTS

| | | | |
|---|---|---|---|
| 3,612,720 | 10/1971 | Stark | 417/50 |
| 3,650,519 | 3/1972 | Vogt et al. | 266/36 H |
| 3,852,408 | 12/1974 | Ewan et al. | 423/243.1 |
| 3,883,045 | 5/1975 | Gerbig | 266/213 |
| 3,900,310 | 8/1975 | Kaasila et al. | 75/23 |
| 3,948,639 | 4/1976 | Nermes et al. | 75/9 |
| 4,005,856 | 2/1977 | Themelis et al. | 266/161 |
| 4,027,863 | 6/1977 | Aaltonen et al. | 266/162 |
| 4,030,915 | 6/1977 | Aaltonen et al. | 75/74 |
| 4,088,310 | 5/1978 | Noponen et al. | 266/162 |
| 4,113,470 | 9/1978 | Aaltonen et al. | 75/74 |
| 4,139,371 | 2/1979 | Makipirtti et al. | 75/73 |
| 4,169,725 | 10/1979 | Makipirtti | 75/74 |
| 4,236,700 | 12/1980 | Makipirtti et al. | 266/161 |
| 4,245,821 | 1/1981 | Kappell et al. | 266/163 |
| 4,308,058 | 12/1981 | Makipirtti et al. | 75/76 |

(List continued on next page.)

FOREIGN PATENT DOCUMENTS 16273 of 1892 United Kingdom ..... 75/645

OTHER PUBLICATIONS

Castle, et al., "Environmental Considerations in the Selection of Metallurgical Processes for the Extraction of Copper and Zinc", *XVth CMMI Congress*, SAIMM, 1994, vol. 2, pp. 315–324.

Rodloff, D., et al., "Review of Flash Smelting and Flash Converting Technology", presented at the 1986 Annual Meeting of AIME, New Orleans, Louisiana, Mar., 1986, pp. 1–32.

Smith, TJA et al, "Oxygen Smelting and the Olympic Dam Project" *Proceedings of the International Symposium on the Impact of Oxygen on the Productivity of Non-Ferrous Metallurgical Processes* Winnipeg Canada pp. 49–50, Aug. 23–24, 1987.

C R Haywood An Outline of Metallurgical Practice p. 24 (D. Van Nostrand Co), 1964.

*Primary Examiner*—Melvyn Andrews
*Attorney, Agent, or Firm*—Whyte Hirschboeck Dudek

[57] ABSTRACT

Fire-refined blister copper is produced from copper concentrate by a process comprising:

A. melting and oxidizing the copper concentrate in a smelting furnace to produce molten matte and slag, and to separate one from the other;

B. removing the molten matte from the smelting furnace;

C. solidifying the molten matte;

D. injecting the solidified matte into a converting furnace in which the matte is converted to blister copper and slag; and E. transfering the blister copper from the converting furnace to an anode furnace to produce fire-refined blister copper.

After the fire-refined blister copper is produced in the anode furnace, it is typically transferred to an anode casting wheel on which it is converted to copper anodes suitable for subsequent electrolytic refining to cathode copper.

20 Claims, 2 Drawing Sheets

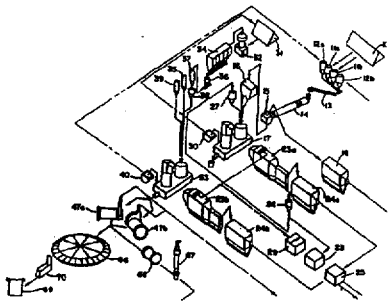

FIG. 2
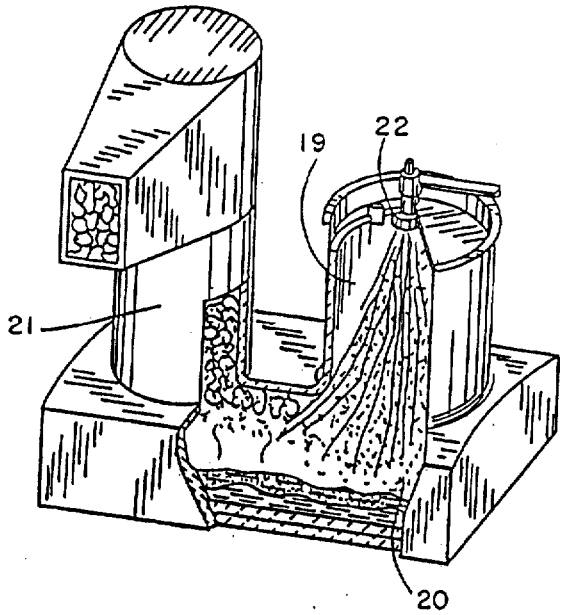
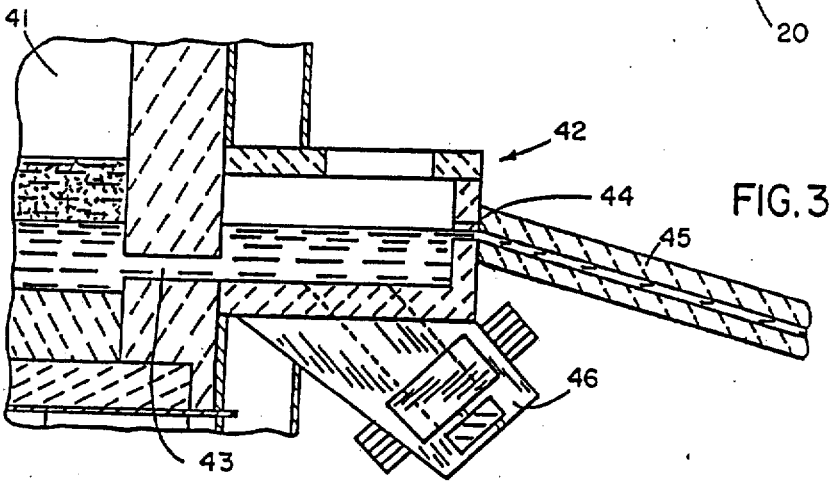
FIG. 3
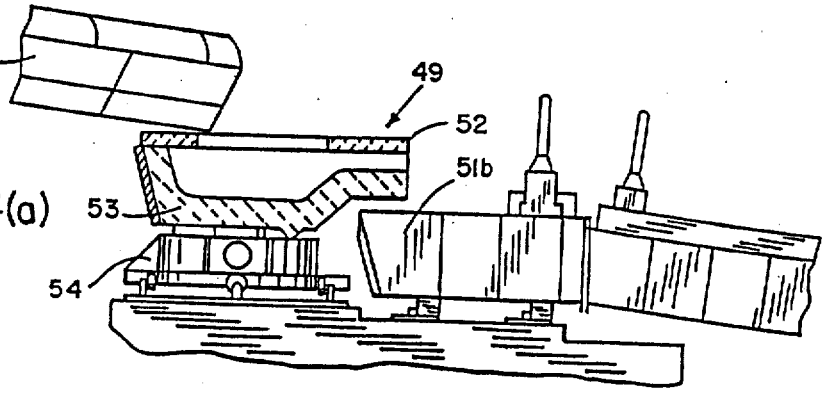
FIG. 4(a)